US008024666B2

(12) United States Patent
Thompson (10) Patent No.: US 8,024,666 B2
(45) Date of Patent: Sep. 20, 2011

(54) APPARATUS AND METHOD FOR VISUALIZING DATA

(75) Inventor: Michael Emmett Thompson, Nogent-sur-Marn (FR)

(73) Assignee: Business Objects Software Ltd., Dublin (IE)

( * ) Notice: Subject to any disclaimer, the term of this patent is extended or adjusted under 35 U.S.C. 154(b) by 691 days.

(21) Appl. No.: 11/478,836

(22) Filed: Jun. 30, 2006

(65) Prior Publication Data
US 2008/0005677 A1   Jan. 3, 2008

(51) Int. Cl.
*G06F 3/048* (2006.01)

(52) U.S. Cl. ........................... 715/764; 345/440

(58) Field of Classification Search ................... 345/440; 715/744, 708, 764
See application file for complete search history.

(56) References Cited

U.S. PATENT DOCUMENTS

| 5,461,708 A * | 10/1995 | Kahn ............................. 345/440 |
| 7,346,858 B1 * | 3/2008 | Berg et al. ..................... 715/853 |
| 2003/0071814 A1 * | 4/2003 | Jou et al. ....................... 345/440 |

* cited by examiner

*Primary Examiner* — Weilun Lo
*Assistant Examiner* — Enrique W Iturralde
(74) *Attorney, Agent, or Firm* — Mintz, Levin, Cohn, Ferris, Glovsky and Popeo, P.C.

(57) ABSTRACT

A computer implemented method includes selecting a portion of a data set in a first visualization. A list of visualizations relevant to the context inferred from the selection of the portion of the data set in the first visualization is generated. A second visualization from the list of visualizations is rendered.

21 Claims, 11 Drawing Sheets

APPARATUS AND METHOD FOR VISUALIZING DATA

BRIEF DESCRIPTION OF THE INVENTION

This invention relates generally to digital data processing. More particularly, this invention relates to techniques for recommending useful visualizations of data.

BACKGROUND OF THE INVENTION

Business Intelligence (BI) generally refers to software tools used to improve business enterprise decision-making. These tools are commonly applied to financial, human resource, marketing, sales, customer and supplier analyses. More specifically, these tools can include: reporting and analysis tools to present information, content delivery infrastructure systems for delivery and management of reports and analytics, data warehousing systems for cleansing and consolidating information from disparate sources, and data management systems, such as relational databases or On Line Analytic Processing (OLAP) systems used to collect, store, and manage raw data.

A subset of business intelligence tools are report generation tools. There are a number of commercially available products to produce reports from stored data. For instance, Business Objects Americas of San Jose, Calif., sells a number of widely used report generation products, including Crystal Reports™, Business Objects OLAP Intelligence™, Business Objects Web Intelligence™, and Business Objects Enterprise™. As used herein, the term report refers to information automatically retrieved (i.e., in response to computer executable instructions) from a data source (e.g., a database, a data warehouse, a plurality of reports, and the like), where the information is structured in accordance with a report schema that specifies the form in which the information should be presented. A non-report is an electronic document that is constructed without the automatic retrieval of information from a data source. Examples of non-report electronic documents include typical business application documents, such as a word processor document, a presentation document, and the like.

A report document specifies how to access data and format it. A report document where the content does not include external data, either saved within the report or accessed live, is a template document for a report rather than a report document. Unlike other non-report documents that may optionally import external data within a document, a report document by design is primarily a medium for accessing and formatting, transforming or presenting external data.

A report is specifically designed to facilitate working with external data sources. In addition to information regarding external data source connection drivers, the report may specify advanced filtering of data, information for combining data from different external data sources, information for updating join structures and relationships in report data, and logic to support a more complex internal data model (that may include additional constraints, relationships, and metadata).

In contrast to a spreadsheet, a report is generally not limited to a table structure but can support a range of structures, such as sections, cross-tables, synchronized tables, sub-reports, hybrid charts, and the like. A report is designed primarily to support imported external data, whereas a spreadsheet equally facilitates manually entered data and imported data. In both cases, a spreadsheet applies a spatial logic that is based on the table cell layout within the spreadsheet in order to interpret data and perform calculations on the data. In contrast, a report is not limited to logic that is based on the display of the data, but rather can interpret the data and perform calculations based on the original (or a redefined) data structure and meaning of the imported data. The report may also interpret the data and perform calculations based on pre-existing relationships between elements of imported data. Spreadsheets generally work within a looping calculation model, whereas a report may support a range of calculation models. Although there may be an overlap in the function of a spreadsheet document and a report document, these documents express different assumptions concerning the existence of an external data source and different logical approaches to interpreting and manipulating imported data.

There are known techniques for graphically portraying quantitative information. The techniques are used in the fields of statistical graphics, data visualization, and the like. Charts, tables, and maps are visualizations of quantitative information. These visualizations can be included in a report document. Visualizations can reveal insights into the relationships between data. In tables, where data is displayed in columns and rows, such insights can be inefficient, difficult, or even impossible, to obtain. While tables are limited in variety, there are many types of charts and maps.

Existing report generation tools have limitations. One limitation is that most users chose to display information in tabular form. This limitation is demonstrated by the frequency of use of tables compared to the other visualizations in representative samples of reports. It is not known exactly why these report authors avoid using the diversity of maps and charts provided by report generation tools It is believed that report authors don't typically think of creating charts and maps because they don't associate individual charts and maps with different questions they may have. Also, studies indicated that when they do endeavor to create a chart from their quantitative data, users find that the mechanics of associating data with axes, defining the relevant parameters, and completing other chart creation tasks is difficult.

In view of the foregoing, it would be highly desirable to provide an improved technique for generating visualizations of data.

SUMMARY OF INVENTION

The invention includes a computer implemented method for selecting a portion of a data set in a first visualization. A list of visualizations relevant to the context inferred from the selection of the portion of the data set in the first visualization is generated. A second visualization from the list of visualizations is rendered.

The invention also includes a computer readable medium with executable instructions to receive a region of focus within a report, derive a plurality of visualizations based on the region of focus, present the plurality of visualizations to a user, receive a choice for a visualization from the user, and generate a rendered visualization in accordance with the choice.

The invention includes a computer readable medium with executable instructions to link a graphic display of quantitative information forming a first visualization with a set of rules to define input to a second visualization. Quantitative information associated with the second visualization is then displayed.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Various features associated with the operation of the present invention will now be set forth. Prior to such description, a glossary of terms used throughout this description is provided.

Chart. A chart includes a collection of visual elements used to convey information. A chart is visualization.

Data. Qualitative or quantitative information that is stored in a data source. Data is the information that is presented in a report. Data can have associated metadata.

Dimension. A dimension is a line in a real or abstract space. An example of a real space dimension is a pair of antiparallel cardinal points on a compass, e.g., North and South, North-northwest and South-southeast. Another real dimension is time. An example of an abstract space dimension is a list of stores. The dimension is abstract because the list can be ordered alphabetically by name, by store number, by distance from head office, etc. Examples of dimensions include region, store, year, customer, employee, product line, and the like.

Family. A family is a group of similar or related things. Visualizations can be grouped into families. Charts can be grouped into families. Families of charts include, but are not limited to: status charts (e.g., gauges, barometers/thermometers, LEDs); variation charts (e.g., radar, polar, heat maps); contribution comparison charts (e.g., pie, stacked 100%, pie series); rank compare charts (e.g., horizontal, grouped bar, deviation/zero axis bar, floating, stacked/subdivided); times series charts (e.g., line graph, column, waterfall/floating, deviated/zero axis, stacked/subdivided bar, stock/open-high-low-close, times series line, times series surface); frequency distribution charts (e.g., histogram, histograph); correlation charts (e.g., scatter plot, bubble plot, paired bar chart, paired/multiple scatter plot, bubble chart); combination charts (e.g., bar chart with line, pie slice with stacked bar, pie in time series, table); and other charts (e.g., graphical lists, spie chart, log plot, semi-log plot, stereogram, contour plot, hanging rootogram, box plot, bag plot, mesh plot, contour plot, graph, network, and tree).

Map. A map is a simplified depiction of a space that highlights relations between elements in the space. Thus, a map is a visualization. Typically, a map is a two-dimensional, geometrically accurate representation of a space. A map is not limited to a two dimensional cartographic map. A map can be augmented to include extra information presented in the form of an added dimension, e.g., height, color, density. A map may include other visualizations in regions of the map, e.g., a map with pie charts in each region.

Measure. A measure is a quantity as ascertained by comparison with a standard, usually denoted in some unit, e.g., units sold, dollars. A measure, such as revenue, can be displayed for the dimension "Year", which is in effect the aggregation of all revenue for all years. Corresponding measures can also be displayed for each of the values within a dimension. Region of focus is either set by default or definable by a user event. The user event includes the user clicking on an area of a table, chart, map or portion therefore which displays quantitative information. The user can select one or more: charts, maps, columns or rows in a table, axes or data within a chart, data in a time series, or regions in a map. Alternatively, the user event can include the user specifying a parameter to a report document. The region of focus is an area of the report which the user wishes to explore.

Metadata is information about information. Metadata typically constitutes a subset or representative values of a larger data set. For example, a piece of metadata could be associated with a piece of data and provide a description to that piece of data.

Table. A table maps the logical structure of a set of data into a series of columns or rows. Thus, a table is a visualization. To facilitate representation in two dimensions, higher-dimensional tables of data are often represented in an exploded view comprising a plurality of two dimensional tables. A table can be rectangular, triangular, octagonal, etc. A table can have row and column headings, where each cell in a table can show the value associated with the specific combination of row and column headings. Some tables can hold charts or maps in their cells; this is a spatially economic way to display many charts with common axes. A table is to be conceptually differentiated from a database table.

Value. A dimension includes one or more values, each of which can have associated measures. For example, the "Year" dimension may include 1999, 2000, 2001, 2002 as its values. The "Quarter" dimension would normally have 4 values corresponding to each quarter. Values can be displayed with associated measures.

Visualization. A visualization is a graphic display of quantitative information. Types of visualizations include charts, tables, and maps.

Figure 1:
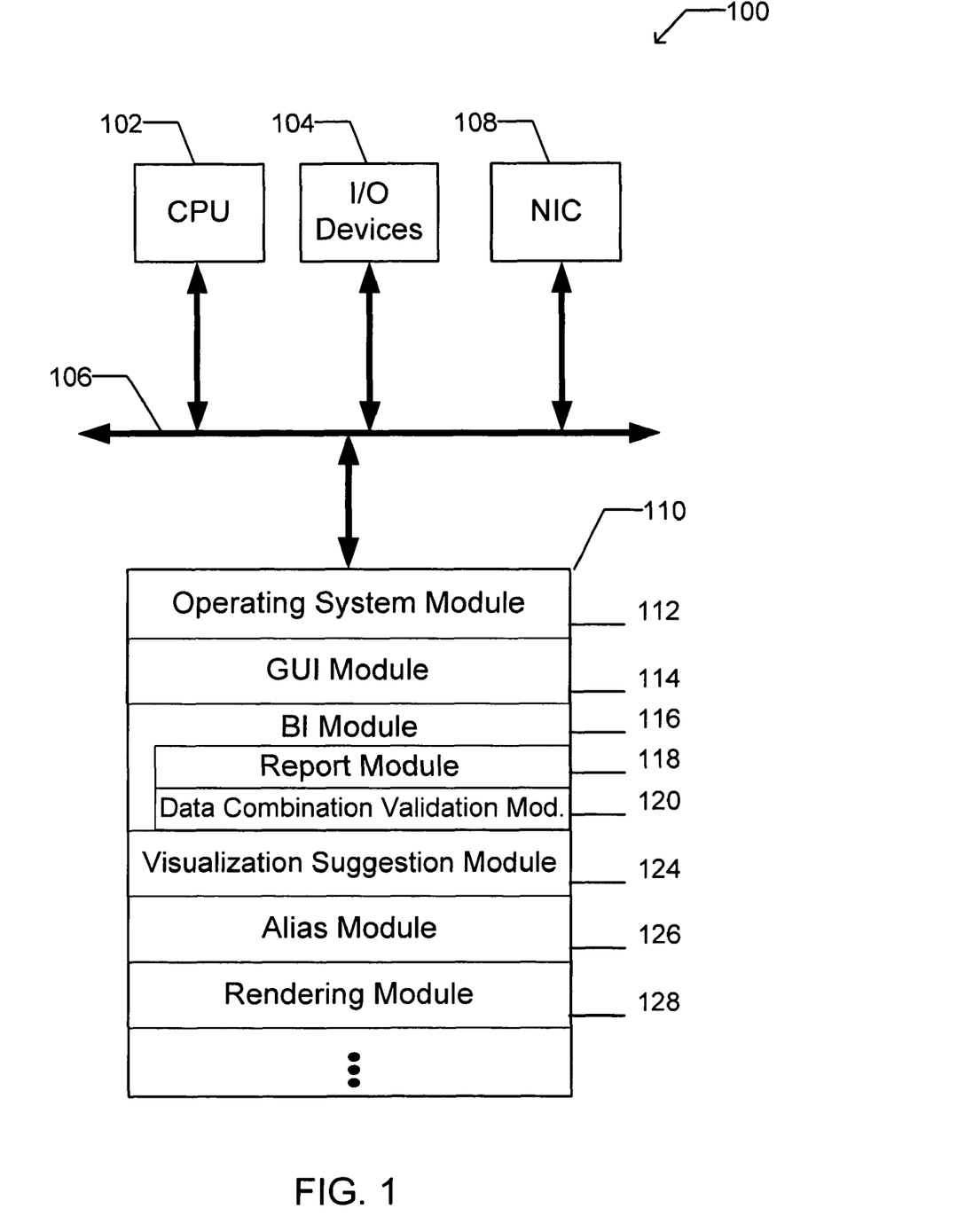
FIG. 1 illustrates a computer configured in accordance with an embodiment of the invention.

FIG. 1 illustrates a computer 100 configured in accordance with an embodiment of the invention. The computer 100 includes standard components, including a central processing unit 102 and input/output devices 104, which are linked by a bus 106. The input/output devices 104 may include a keyboard, mouse, touch screen, monitor, printer, and the like. A network interface circuit 108 is also connected to the bus 106. The network interface circuit (NIC) 108 provides connectivity to a network (not shown), thereby allowing the computer 100 to operate in a networked environment.

A memory 110 is also connected to the bus 106. In an embodiment, the memory 110 stores one or more of the following modules: an operating system module 112, a graphical user interface (GUI) module 114, a business intelligence (BI) module 116, a report module 118, a data combination validation module 120, a visualization suggestion module 124, an alias module 126, and a rendering module 128.

The operating system module 112 may include instructions for handling various system services, such as file services or for performing hardware dependant tasks. The GUI module 114 may rely upon standard techniques to produce graphical components of a user interface, e.g., windows, icons, buttons, menu and the like, examples of which are discussed below.

The BI module 116 includes executable instructions to perform BI related functions, such as, generate reports, perform queries and analyses, and the like. The BI module 116 can include the report module 118, and the data combination validation module 120. The report module 118 can include aspects of known report generation tools. The data combination validation module 120 includes executable instructions to interpret the metadata associated with the data in the user's region of focus and any semantic relationship amongst the data to create further metadata on the report that other modules in memory 110 can use. The data combination validation module can determine if a combination of two pieces of data is semantically acceptable. That is, "is the combination meaningful?"

The visualization suggestion module 124 includes executable instructions to automatically generate a list of prioritized visualization options based on input from the user's region of focus, the report context and the data combination validation module 120. The list is generated with the objective of enhancing utility of a visualization creation program by anticipating which visualizations a user will find useful as well as eliminating the irrelevant or impossible visualizations.

The alias module 126 includes executable instructions to provide an alias to a visualization. The alias serves two purposes. One, it replaces the name of the visualization with a question, or a statement, in terms that a user should find more meaningful, e.g., business terms. For example, instead of displaying "scatter plot" among a list of many possible chart types, module 126 will generate for a user a question such as: "would you like to view the relationship between sales revenue and units sold with regards to city values?", where sales revenue, units sold, and city values are data in the report the user is viewing. An example of a statement includes "view of the relationship between sales revenue and days in sales training for units sold." The alias module 126 can interact with the list generator module 124 to create an alias for the visualizations the list generator module produces. In an embodiment, the alias serves a second purpose. Each alias contains a hyperlink which enables users to automatically generate the corresponding chart, including the mapping of dimensions and measures to axes and the appropriate formatting and layout to improve readability. In this embodiment, the user intervention is ideally reduced to a click on the alias.

The rendering module 128 includes executable instructions to provide logic to apply the best practices of charts and maps to the selection of visualizations. The logic applies some best practice insight into the most relevant charts for the context of the dimensions and their corresponding values and measures. Module 128 can exclude some visualizations from the list which are known to be visually limited. The module can tweak visualization to improve how data is presented. For example, the readability of a visualization depends on the number of values associated with the dimensions associated with the visualization's axes. For example, pie charts become difficult to read when there are greater than about 15 slices or there are 3 or more slices representing less than 5% of the total. In such cases, the smallest slices can automatically be grouped as "other".

The executable modules stored in memory 110 are exemplary. It should be appreciated that the functions of the modules may be combined. In addition, the functions of the modules need not be performed on a single machine. Instead, the functions may be distributed across a network, if desired. Indeed, the invention is commonly implemented in a client-server environment with various components being implemented at the client-side and/or the server-side. It is the functions of the invention that are significant, not where they are performed or the specific manner in which they are performed.

In an embodiment, memory 110 includes a data source (not shown). In another embodiment the data source is external to computer 100, e.g., connected to computer 100 via NIC 108. The data source holds the data for reports created by the report module 118. The data source can include a metadata component. In the art there are examples of database programs with a semantic layer. See, commonly assigned U.S. Patent, Cambot et al., 1996, U.S. Pat. No. 5,555,403, which is hereby incorporated by reference in its entirety. In an embodiment, the metadata is encoded in the schema of the data source.

Figure 2:
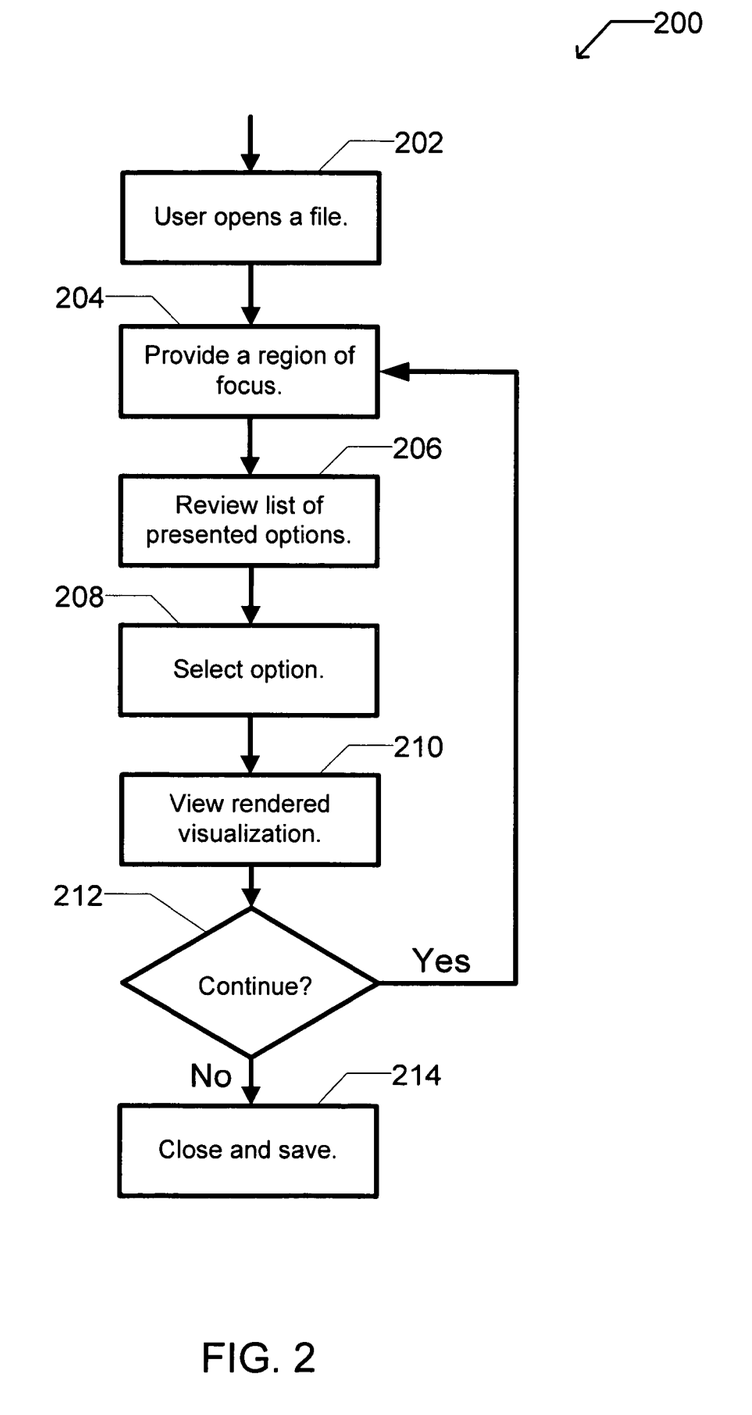
FIG. 2 illustrates a series of processing operations associated with an embodiment of the invention.

FIG. 2 illustrates a workflow 200 that a user follows while interacting with computer 100. In the first processing operation the user opens a file, e.g., a report, 202. In the second processing operation, the user provides a region of focus 204. For example, a region of focus can be provided when a user selects a region of displayed data or a piece of a visualization. A region of displayed data includes part or all of one or more rows or columns of data. The user is effectively saying "I want to do something with this portion of the data or visualization." Alternatively, a user can specify a region of focus by specifying a parameter to a report document. In an embodiment of the invention, operation 204 can include specifying other parameters.

In processing operation 206, the user reviews a list of options for visualizing the data in the region of focus. The list of visualization options is presented to the user by computer 100. In an embodiment, the list is prioritized. The user selects from the options presented in the list 208. After the user has made a selection, or a default selection is triggered, a visualization is rendered, displayed to, and viewed by the user 210. These processing operations can be repeated. If 212-Yes, then the process iterates. The list of visualizations is automatically refreshed when the user changes the region of focus. In an embodiment, the user manually refreshes the list of visualizations. For example, the user provides a new region of focus within the new visualization. Otherwise, 212-No, and the user moves on, possibly, to an optional save and close operation 214.

In various embodiments of the present invention, the set of workflow 200 occurs where the selection of focus is part of a table, a chart, or a map. The processing operations for each embodiment are the same as shown in FIG. 2 with appropriate changes. A table is an exemplary starting visualization from which a user can select a region of focus. In an embodiment of the present invention, computer 100 suggests a map or chart to augment or replace the table. Charts and maps are other examples of a starting visualization. These can lead to other visualizations within the same family of visualizations, the same visualization with a new measure added, or a table.

Figure 3:
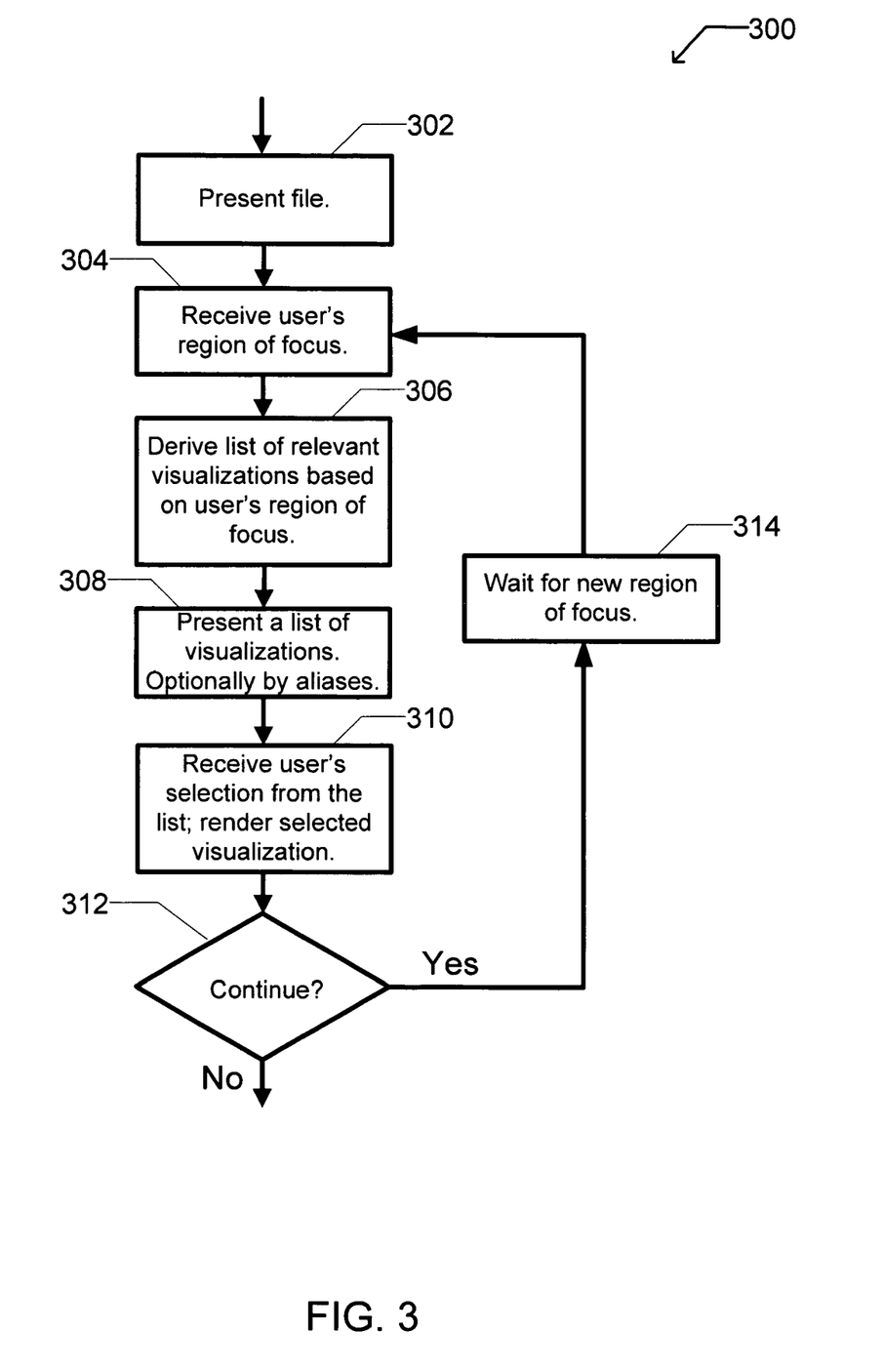
FIG. 3 illustrates a series of processing operations associated with an embodiment of the invention.

FIG. 3 illustrates a set of processing operations 300 that computer 100 implements as a counterpart to the user's operation in FIG. 2. In processing operation 302, the computer 100 presents a file to the user. The computer then receives the user's region of focus 304. Using this region of focus the computer derives a list of visualizations 306. This list is presented 308. Then the computer 100 receives the user's selection for a visualization from the list 310. The selected visualization is rendered 310. The processing operations 302-310 can be repeated via branch 312-Yes. There, computer 100 waits for the user's new selection of focus 314. Each of these processing operations will be detailed below.

The first two processing operations of FIG. 3 commonly include the computer 100 response to actions by the user. In processing operation 302 the computer 100 presents a file to the user which the user has specified (see processing operation 202 of FIG. 2). The file contains some data either in raw format or as some visualization, e.g., a table. In the optional processing operation 304 the computer 100 receives a region of focus within the file. The region of focus is to some part of the data. For example, the user selects a column of data in a table. In an embodiment, the selection of the column corresponds to the selection of a dimension or a measure.

Processing operation 306 includes the computer 100 executing instructions from the visualization suggestion module 124 to derive a list of relevant visualizations based on the combination of the following: the region of focus, the report content, the semantics of possible combinations of dimensions and measures, and the best practices for displaying data. The executable instructions in the visualization suggestion module 124 can invoke instructions in the other modules. The invocation of instructions from the data combination validation module is to determine if a combination of dimensions or measures is semantically acceptable. That is, "is the combination meaningful?" Instructions in the rendering module 128 are used to determine if visualizations are visually acceptable per heuristics or best practices of the art. Instructions in the alias module 126 can be invoked in operation 306 to create an alias for a visualization.

In processing operation 306, while computer 100 could propose every possible visualizations, it is believed that a user would benefit from being presented with a limited set of visualizations. For example, consider a report whose content includes a time-based dimension, e.g., year. Because it is known that a time-based based dimension is a prerequisite to propose Time Series charts, and is distinct from other dimensions for charting purposes, computer 100 would propose, among other chart types, an alias that combines the region of focus and the time-base dimension for creating a time-series chart. If no time dimensions exist in either the region of focus or the context of the report, then no time-series charts would be proposed. In an embodiment, the user is able to view the exhaustive list of possible visualization options. Processing operation 306 can include ranking the list of visualizations.

The data combination validation module 120 allows a list of visualizations to be created in processing operation 306 for data by accessing the data's metadata. In an embodiment, data combination validation module 120 applies logic that encodes whether a certain measure can be combined with the selection focus. For example, a measure "revenue" can be combined with a wide range of dimensions in different contexts (e.g., product, salesperson, city, customer). However, a measure (e.g., salary) relates to employees and should not be combined with other dimensions (e.g., product number). In an embodiment, data combination validation module 120 applies logic to ensure that a dimension in a hierarchy of dimensions is not visualized against another dimension in the same hierarchy of dimensions. For example, a chart showing which months are in which quarter would be an unlikely candidate for suggestion. However, a hierarchy of dimensions can be stacked onto the same axis. For example, a chart could include an axis showing both regions and cities, with the cities grouped by region. In processing operation 306, the visualization suggestion module 126 can combine the region of focus with other relevant dimensions and measures from the report context. The data combination validation module 120 encodes the semantic meaning of the combinations of measures and dimensions. This semantic meaning can be used to create and prioritize the list of visualizations presented to the user.

In processing operation 308 the computer 100 presents the most highly prioritized options to the user. In one embodiment, visualizations are presented in terms that a user should find more meaningful, e.g., business terms. Computer 100 may use the alias module 126 to implement this operation. The alias module 126 may interact with the list generator module 124 to create an alias for visualizations and families of visualizations.

In processing operation 308 the computer 100 may invoke executable instructions in the alias module 126 together with instructions in the data combination validation module 120. The data combination validation module identifies data by its metadata. For example, the module differentiates between a dimension, a measure, etc.

An alias for a visualization can be created by piecing together the names for semantic objects with some action verbs and qualifying adjectives. This is possible because any given chart can be described in general terms. For example, a chart from the component comparison family such as a Pie chart enables users to compare the proportions of the values of a dimension against each other and the whole. A correlation chart, such as a scatter plot, compares the relationships between two measures. For example, a chart that plots a dimension against a measure can be easily converted into a question by asking "would you like to see the relationship between" the data name associated with the dimension "and" the data name associated with the measure "?".

In processing operation 310 the computer 100 receives a choice for a visualization from the user and renders the visualization. The choice could be for a chart. The computer 100 creates the chart with the data in the region of focus. In an embodiment, this chart is returned to another program, the user, or is displayed on an output device.

At processing operation 312, unless the computer 100 is programmed to stop or receives an input from the user specifying stop, the operations 302-310 are repeated after a new selection of focus is provided 314. As with the original region of focus, the user can select one or more columns or rows in a table, axes or data within a chart or regions in a map. The new region of focus can be in the newly generated visualization or in the original visualization. The repeating of operations 302-310 allows for iterative analysis of data. That is, at every instance of processing 302, the region of focus can be refined.

Figure 4A:
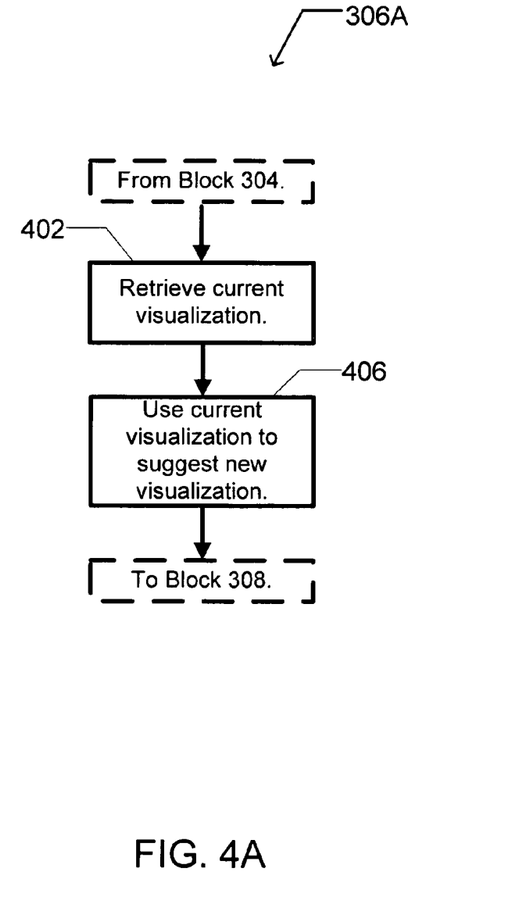
FIGS. 4A and 4B each illustrate a series of processing operations associated with one of two embodiments of the invention.
Figure 4B:
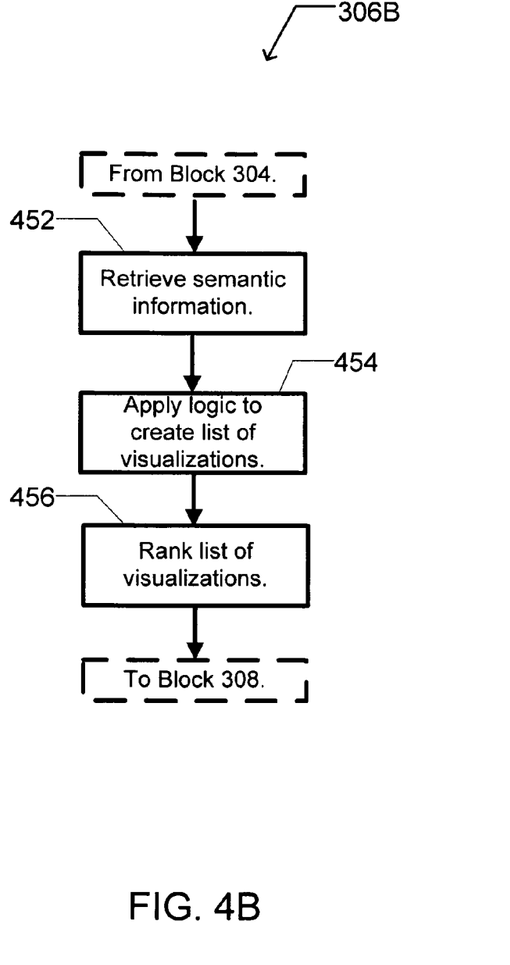

FIGS. 4A and 4B each illustrate an alternative implementation for deriving a list of visualizations based on the user's selections of focus. Each of the set of processing operations 306A or 306B can occur in processing operation 306 of FIG. 3. All the processing operations included in sets 306A and 306B are optional and operations from both sets can be combined.

FIG. 4A illustrates processing operations for deriving a list of visualizations based on the user's selections of focus. Computer 100 retrieves the visualization where the region of focus resides 402. Using knowledge of the current visualization, a new visualization or set of visualizations is suggested. For example, if a Pie Series Chart is selected, the computer may suggest a Stacked 100% Chart as an alternative. These charts have similar behaviors as to what types of data are placed on their axis, but are visually different. Visualizations that are natural evolutions of the current visualization can be suggested. For example if the current visualization is a scatter plot, a bubble plot is suggested.

FIG. 4B illustrates processing operations for deriving a list of visualizations based on the user's selections of focus. Computer 100 retrieves semantic information about the region of focus 452. This can include retrieving, processing, and interpreting the metadata associated with the data in the user's region of focus and any semantic relationship amongst the data.

In processing operation 454, logic is applied that creates a list of visualizations. The logic takes the region of focus, or semantic information, and suggests one or more visualizations. For example, if two columns in a table are selected, and one is a dimension and the other a measure, it would be logical to suggest plotting the measure against the dimension. If the two columns are both dimensions, a measure and a chart could be suggested to plot the measure against the dimensions; the measure should be related to both dimensions.

In processing operation 456, the list of visualizations is ranked. Ranking helps the user by presenting visualizations that the user is likely to choose at the top of the list. The ranking can be based on heuristics which in turn can be based on best practices or statistics collected from many users. Alternatively, the ranking can be based on the past choices of the user. In an embodiment of the present invention the ranking is within the type of visualization only. For example, the ranking is within a given family of charts.

Figure 5:
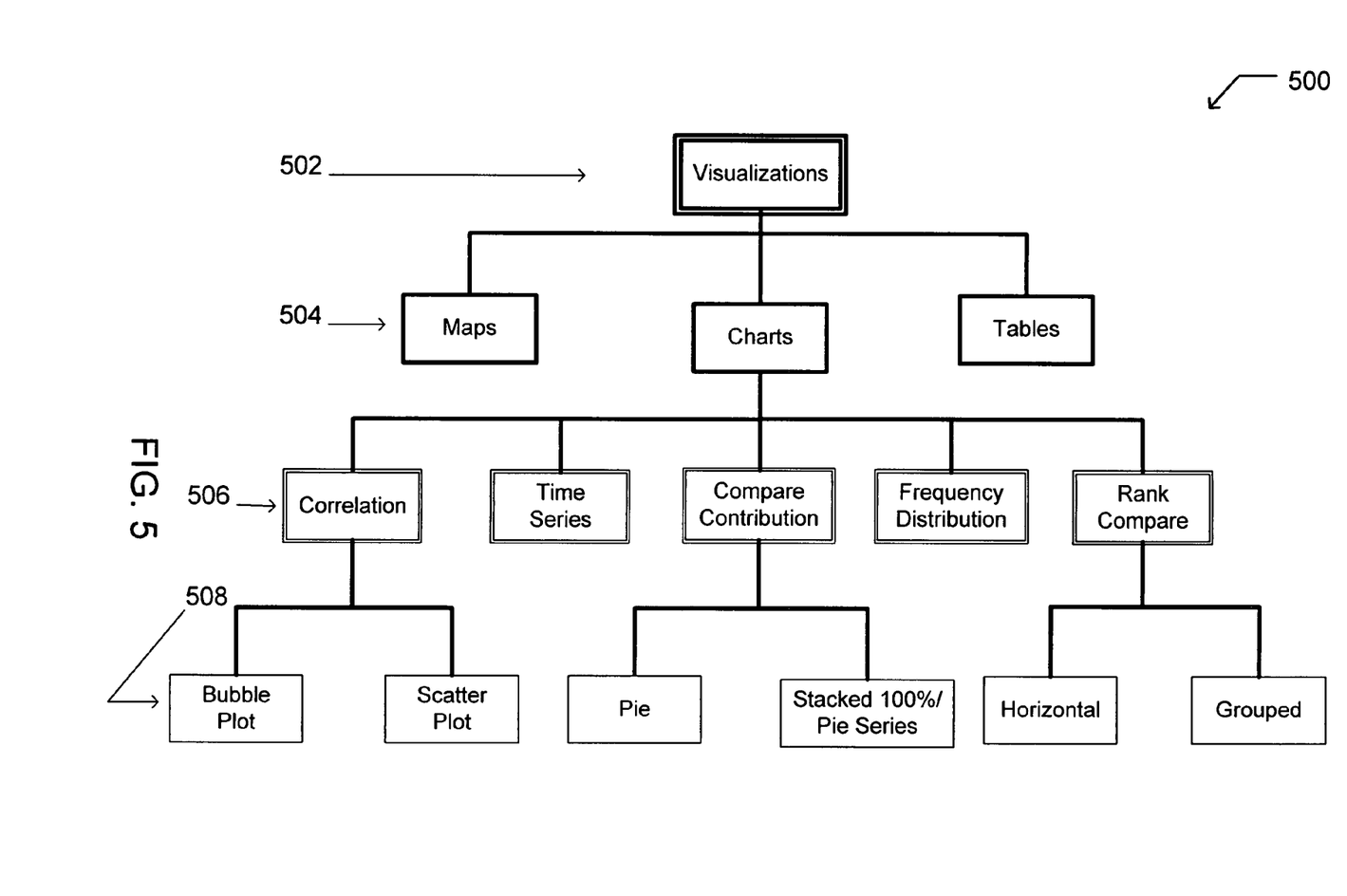
FIG. 5 illustrates an example of a hierarchy of visualizations.

FIG. 5 illustrates an example of a hierarchy of visualizations 500. The root of the hierarchy is on level 502. Visualizations are divided into maps, charts, and tables on level 504. Various families of charts are grouped on level 506. Some examples of chart types are shown on level 508. The hierarchy of visualizations 500 is not exhaustive. More visualization families and visualizations can be included in the hierarchy of visualizations 500. For example, a bar chart can be included in the rank compare family. Various pieces of logic can be applied to select visualizations from a hierarchy. The question the visualization is meant to answer can serve to suggest visualizations. Examples of these questions and implied visualizations include:

How do components contribute to the whole? The implied visualizations are from the Compare contribution family at level 506 in hierarchy 500. This family includes Pie, 100% Bar, and Stacked 100% Charts.

How do the items rank against each other? The implied visualizations are from the rank compare family at level 506 in FIG. 5. This family includes Horizontal Bar Charts, Deviated Bar Chart, and the like.

How does it change over time? The implied visualization family is Time Series.

What is the distribution of the range of values? The implied visualization is the Frequency Distribution chart family.

How do these items relate to each other? The implied visualizations are Correlation Charts.

How do these items appear in a geography? The implied visualization is a Map on level 504.

What are the actual numerical values and calculations associated with dimensions? The implied visualization is a Table on level 504 in FIG. 5.

Figure 6:
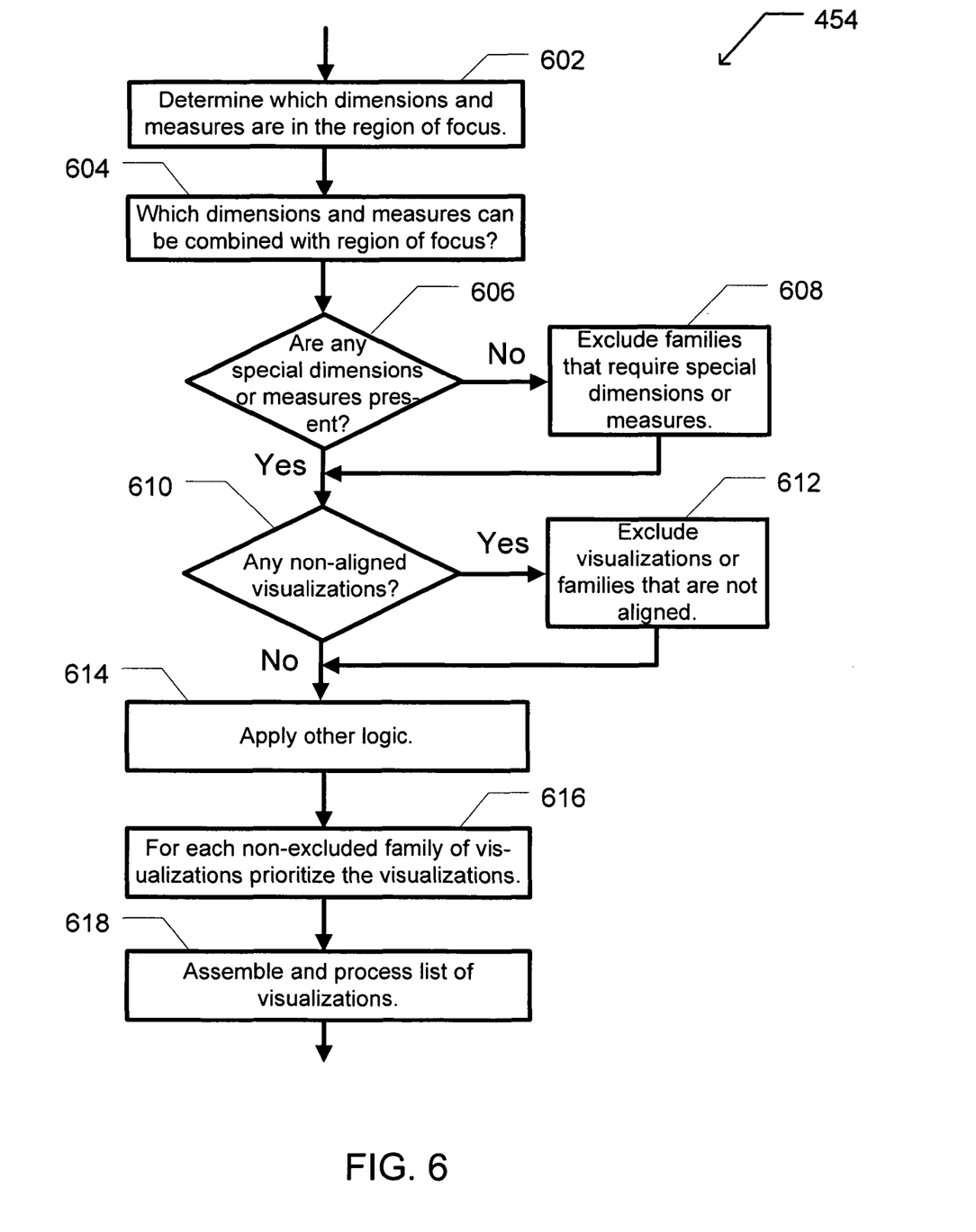
FIG. 6 illustrates a series of processing operations associated with an embodiment of the invention.

FIG. 6 illustrates an example of a set of processing operations 454 that applies various pieces of logic to derive a list of visualizations. The list can be created in parts and assembled later. In processing operation 602, the computer 100 applies logic to determine which dimension and measure are in the region of focus.

In operation 604 the region of focus is expanded to include other dimensions and measures that can be combined with the region of focus, such that the resulting combination is semantically acceptable. For example, combining product and employee or population of a city and employer, are not semantically acceptable combinations. In an embodiment, the expanded region of focus is the same as the region of focus.

Optionally, in processing operation 604 computer 100 applies logic that includes possible visualizations based on a predetermined hierarchy of dimensions. In various embodiments, dimensions are linked to other dimensions through a shared hierarchy. For example, the dimensions "Product Line", "Product Name", and "SKU Number" are related in that their values can be associated with measure "Revenue". Therefore, if one of these dimensions or the measure revenue is in the region of focus, the remaining dimensions and/or measure can be added to the expanded region of focus.

Optionally, in processing operation 604 computer 100 applies logic that expands the selection of focus based on a predetermined hierarchy of measures or relationships between two or more measures. For example, the Product dimension is linked to the Customers dimension by the measure Units Sold.

In processing operation 606 the computer 100 applies logic to determine if there are any special dimensions or measures present in the expanded region of focus. Special dimensions include People, Geography and Time. If 606-No, then for each absence the families and visualizations that are exclusively for special dimensions and measures are excluded 608. If 606-Yes, then processing continues at operation 610.

Computer 100 applies logic to determine if there are remaining (i.e., non-excluded) visualizations or families of visualizations which are not aligned with the expanded region of focus with regards to mapping dimensions and measures to chart axis 610. A visualization such as a map or a chart has one or more axes. Various visualizations have restrictions as to what may be mapped to their axes. A non-aligned visualization is a visualization that would not permit, due to restrictions, all or part of the expanded region of focus to be mapped to its axis. Therefore, if 610-Yes, each non-aligned family of visualizations or visualization is excluded 612. If 606-No, then processing continues at operation 614.

In processing operation 614, computer 100 applies other logic to exclude or include visualizations to the list. The other logic can include logic that suggests possible visualizations based on the best practice for charting.

For each non-excluded family of visualizations, the visualizations with each family can be prioritized 616. In the foregoing processing operations of process 454, a series of partial lists for visualizations is created. These lists are combined into one list 618. This list can be processed in operation 618. The processing can include alphabetizing, inserting the list into a data structure, etc.

The operations in FIG. 6 are all optional and can be performed in any order. The processing operations 600 can each generate their own plurality of relevant visualizations or mutually generate a plurality of relevant visualizations. One possible manner of implementating the processing operations 600 is in accordance with the so called Mediator Design Pattern.

Figure 7:
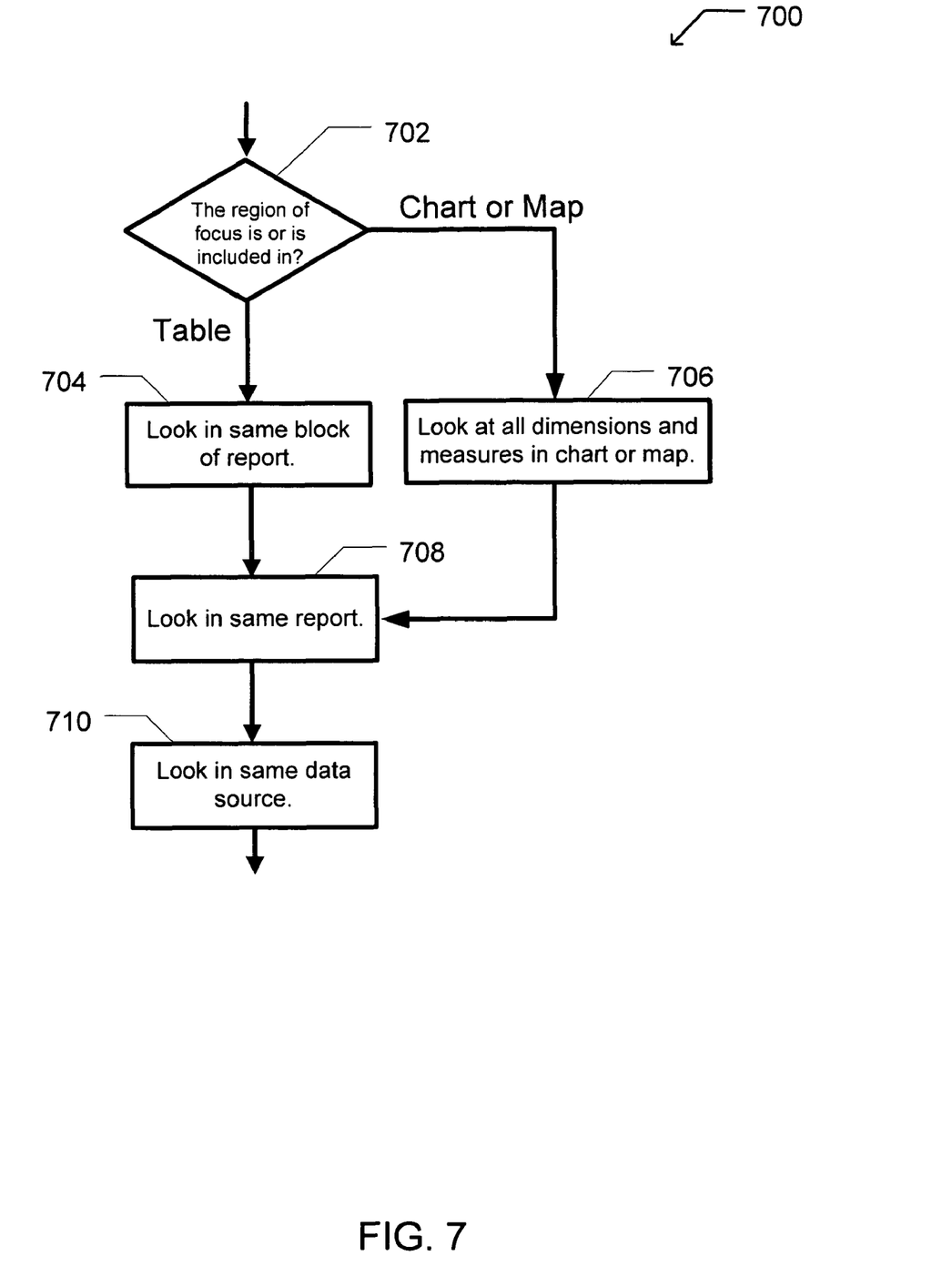
FIG. 7 illustrates a series of processing operations associated with an embodiment of the invention.

FIG. 7 illustrates an example of a set of processing operations showing how the region of focus can be expanded and visualizations within a family can be prioritized 700. These processing operations could be contained in operations 604 or 616 from FIG. 6, respectively. The expanded region of focus becomes the input to various visualizations. Proximity is used to determine the order in which dimensions and measures are added to the region of focus. No dimension or measure is added if the combination of the measure or dimension and the region of focus have no semantic meaning. Proximity is used to determine the priority of visualizations within a family of visualizations.

In the first processing operation 702, computer 100 determines which type of visualization the region of focus includes or is included in. If 702-Chart or Map, then the processing continues at operation 706. If 702-Table, then the processing continues at operation 704.

The same block of the report as the unexpanded region of focus is examined 704. For example, by looking left and right (or up and down) in the same table as the unexpanded region of focus, the region of focus can be expanded or the prioritization with families can be made. The closer the dimension or measure is to the region of focus the higher priority the associated visualization is given. For expanding the region of focus the dimensions and measures that are closest to the unexpanded region of focus are added first. However, each addition to the region of focus must make semantic sense.

In processing operation 706 all dimensions and measures in the chart or the map of the region of focus are examined. In the case of expanding the region of focus each dimension and measure is added, provided the addition has semantic meaning.

In processing operation 708, the region of focus is expanded, and priority assigned, by sequentially adding dimensions and measures from the rest of the report, for example, by looking up and down from the unexpanded region of focus in the report.

Finally, the region of focus is expanded and priority is assigned by adding dimensions and measures from the same data source as the report 710. In processing operation 710, proximity is defined per the data source schema. In an embodiment of the present invention, process 700 can end once a certain number of dimensions and measures have been added.

Figure 8:
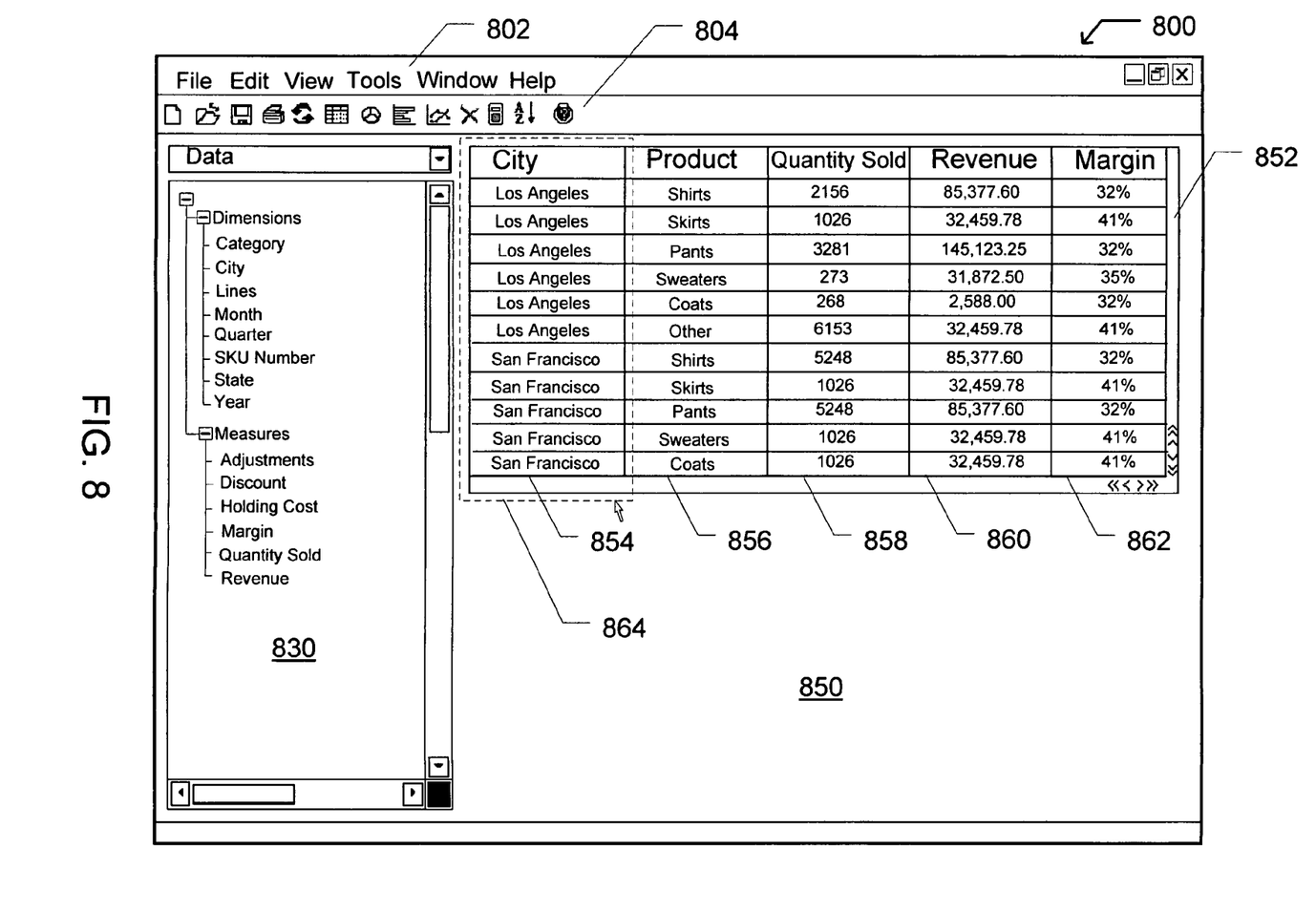
FIG. 8 illustrates a graphical user interface configured in accordance with an embodiment of the invention.

FIG. 8 illustrates a graphical user interface 800 configured in accordance with an embodiment of the invention. The GUI 800 could be included in a window presented on an output device of computer 100. The GUI 800 includes a menu bar 802 and a tool bar 804. The window is divided into a navigation pane 830 and a freeform pane 850. The navigation pane 830 is for navigating between and around reports. The freeform pane 850 displays visualizations and text included in the report. Other configurations of GUI are well known in the art.

In the freeform pane 850 there is a table 852. Table 852 includes a series of dimensions (i.e., "City" 854, "Product" 856) and measures (i.e., "Quantity Sold" 858, "Revenue" 860, "Margin" 862). Further dimensions and measures are shown in navigation pane 830. One of the dimensions "City" forms the user's region of focus 870. After the region of focus has been specified, the selection of a new visualization can begin. For example, by selecting from a menu or clicking on an icon.

In addition to the specification of the region of focus 870, additional parameters can be specified by the user. For example, GUI 800 can display a dialog box asking: "Would you like to create the new visualization as: a new visualization in this report; a replacement to the current visualization; or a new visualization in a new report?" Assuming the user opts for adding a new visualization to the current report, the region of focus and the context of the report are used to suggest the new visualization.

The region of focus 864 is the column "City" 854 which computer 100 knows is a dimension. The region of focus does not include a measure but a plurality of measures is logically related to the City dimension 854. These measures are adjacent to the region of focus and from these a list of visualizations can be generated. Computer 100 retrieves semantic information about these measures. For example, in an embodiment computer 100 suggests plotting the City dimension 854 in region of focus 864 against a measure. There are several measures to chose from—i.e., Quantity Sold 858, Revenue 860, Margin 862, and those shown in navigation pane 830. Therefore, one or more visualizations for each measure that is semantically acceptable to combine with the region of focus is suggested. The visualizations which correspond to measures that are closest to the region of focus are given higher priority. In an embodiment, visualizations can also be prioritized by past choices, preprogrammed defaults or the like.

In the case of prioritization by proximity to the region of focus, the number of measures which can be combined with the City dimension 854 to create the new visualization can be prioritized by the measures in the same table, then in a part of the same report, and finally in another report. Thus, in this example the prioritization is: Quantity Sold, Revenue, Margin, City Discount, etc. There can be a secondary prioritization in which past choices and preprogrammed defaults are considered.

The user may be presented with a new visualization or a choice for visualizations. For example, the user may be presented with a dialog: "would you like to see how cities contribute to total revenue?" amongst other questions. If the answer is yes, the corresponding visualization is created.

Figure 9:
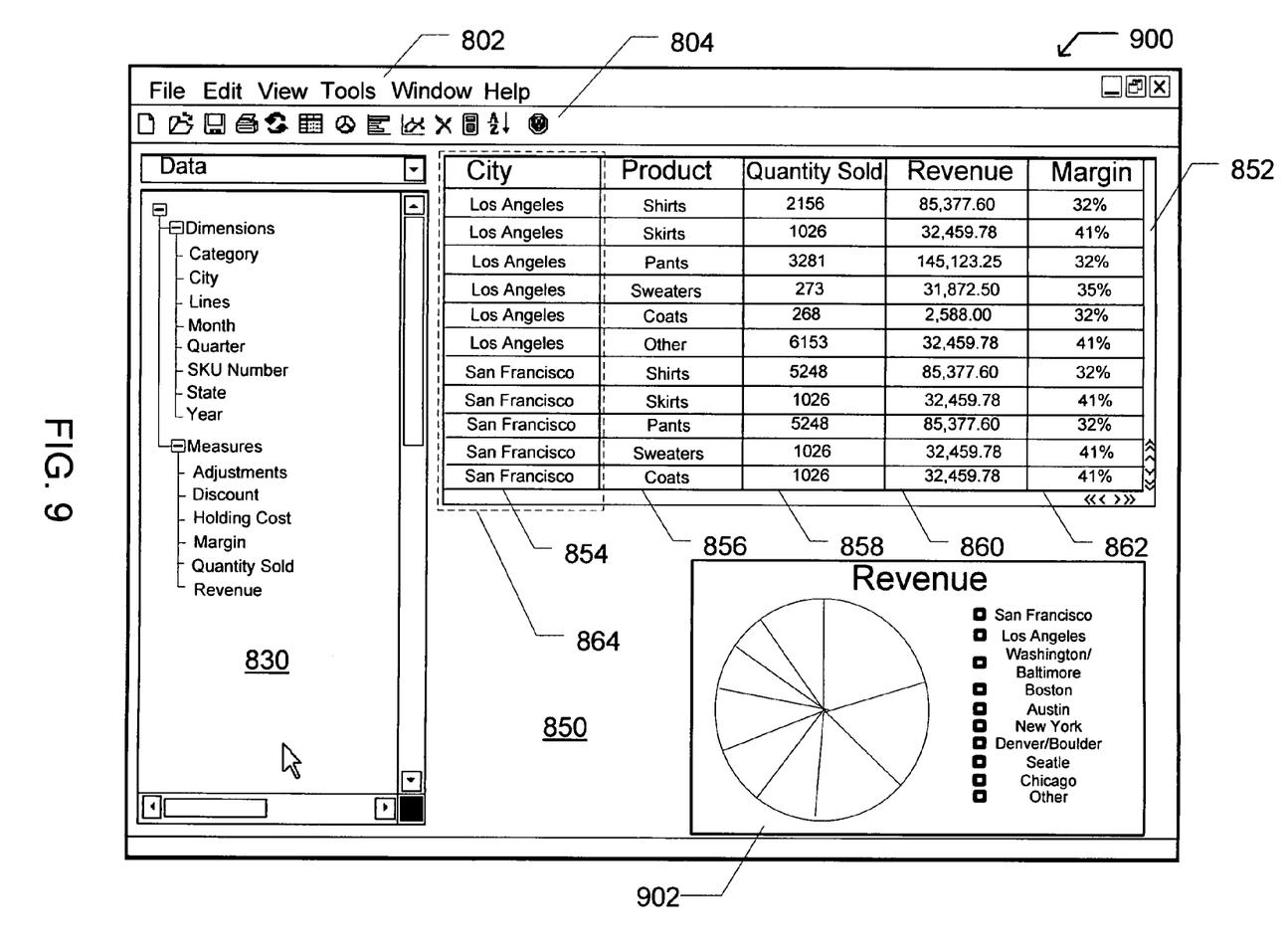
FIG. 9 illustrates the graphical user interface of FIG. 8 depicting a work flow in accordance with an embodiment of the invention.

FIG. 9 illustrates a graphical user interface 900 depicting an updated version of the GUI 800. Included in the freeform pane 850 is a graph 902. The graph 902 is a pie chart that shows how each city contributes to the total revenue. In an embodiment, the graph 902 is the new region of focus per branch 312-Yes of FIG. 3.

Figure 10:
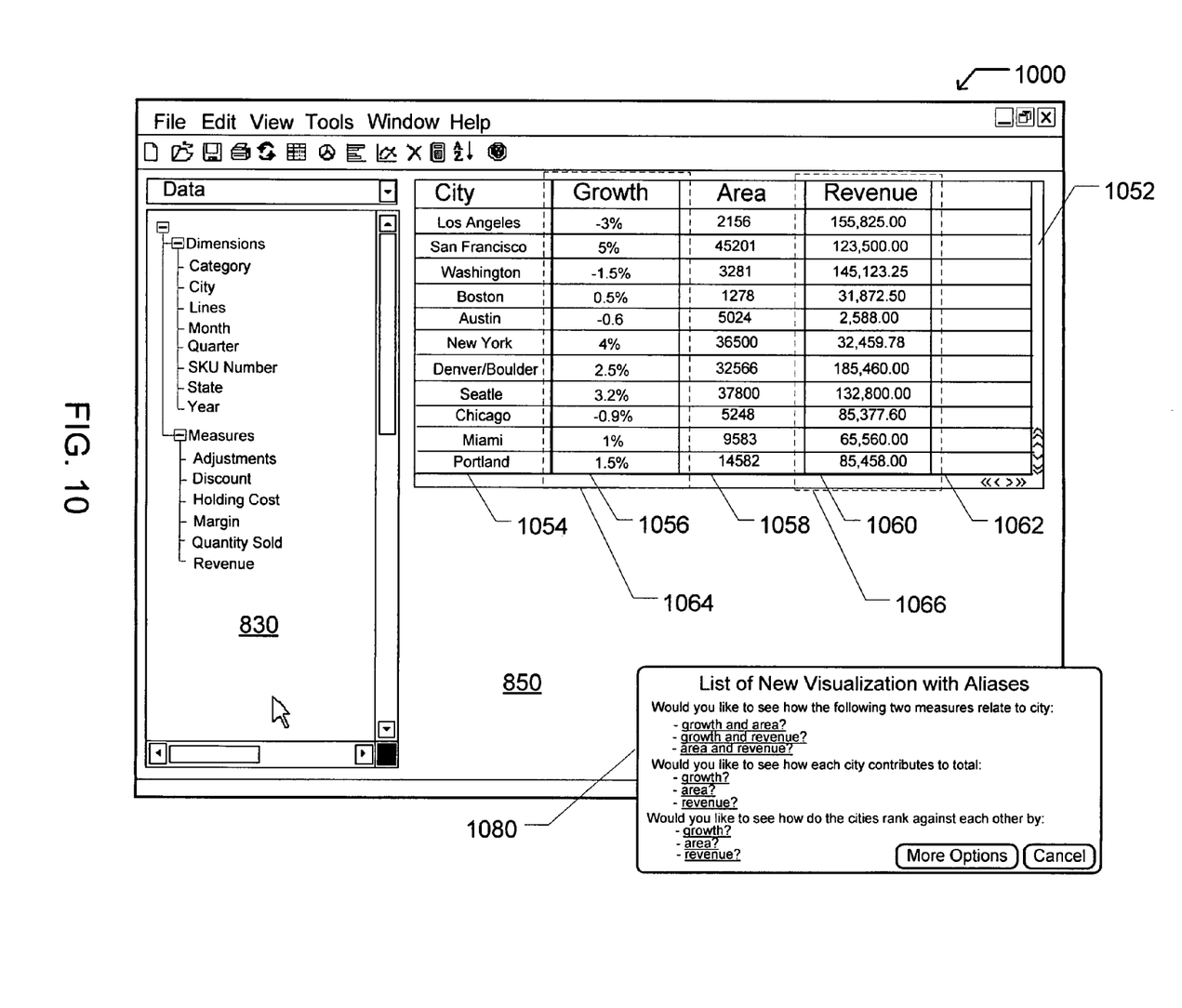
FIG. 10 illustrates the graphical user interface of FIG. 8 depicting a work flow in accordance with an embodiment of the invention.

FIG. 10 illustrates a graphical user interface 1000 configured in accordance with an embodiment of the invention. The graphical user interface 1000 shares many similarities with the graphical user interface 800 of FIG. 8. The graphical user interface 1000 illustrates a workflow showing a visualization generated from a table. Included in the freeform pane 850 is table 1052. Table 1052 has a series of columns: "City" 1054, "Growth" 1056, "Area" 1058, and "Revenue" 1060. The user has provided a region of focus in two parts: a first part of the region of focus 1064 and a second part of the region of focus 1066. In an embodiment, the user generates a list of new visualizations to augment the table 1052 by clicking on the region of focus. Because the region of focus includes measures only, and two measures are present, visualizations from the correlation chart family are suggested. Charts from the compare contribution family are also possible. In an embodiment, a dialog box 1080 appears with a list of visualizations (with or without aliases). In another embodiment, the list appears elsewhere, e.g., on the left hand side of the GUI in place of the navigation pane 830.

Figure 11A:
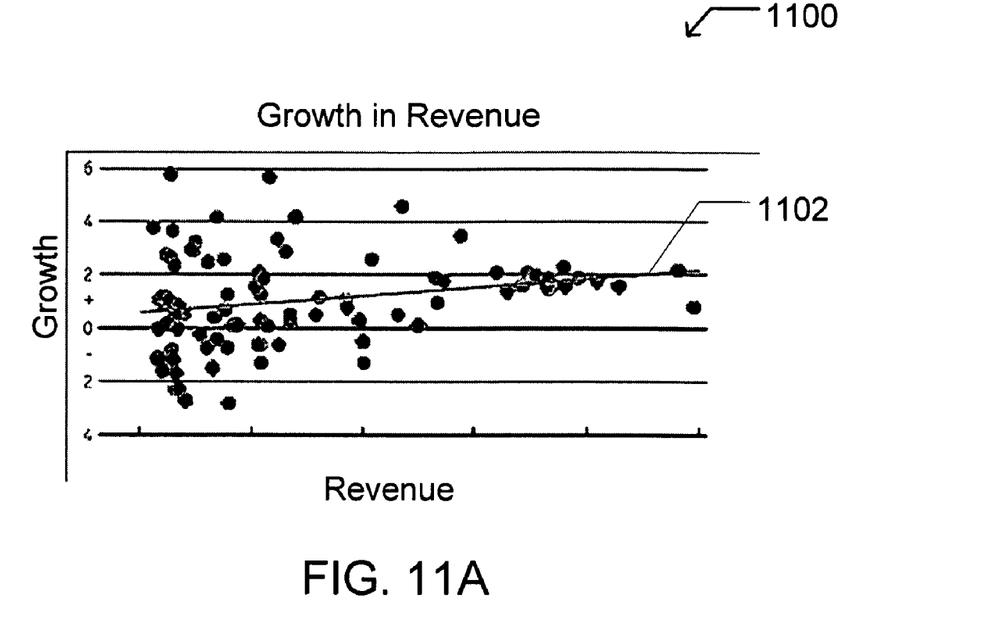
FIG. 11A illustrates a visualization resulting from the work flow of FIG. 10.

FIG. 11A illustrates a scatter plot 1100 as the resultant visualization from the work flow described in relation to FIG. 10. The visualization shows growth in revenue for the stores in each city. Each city is a uniformly sized circle in scatter plot 1100. Given this visualization, a bubble plot is suggested to the user. In this case, the user could be prompted with "would you like to see growth in revenue by revenue proportional to area?"

Figure 11B:
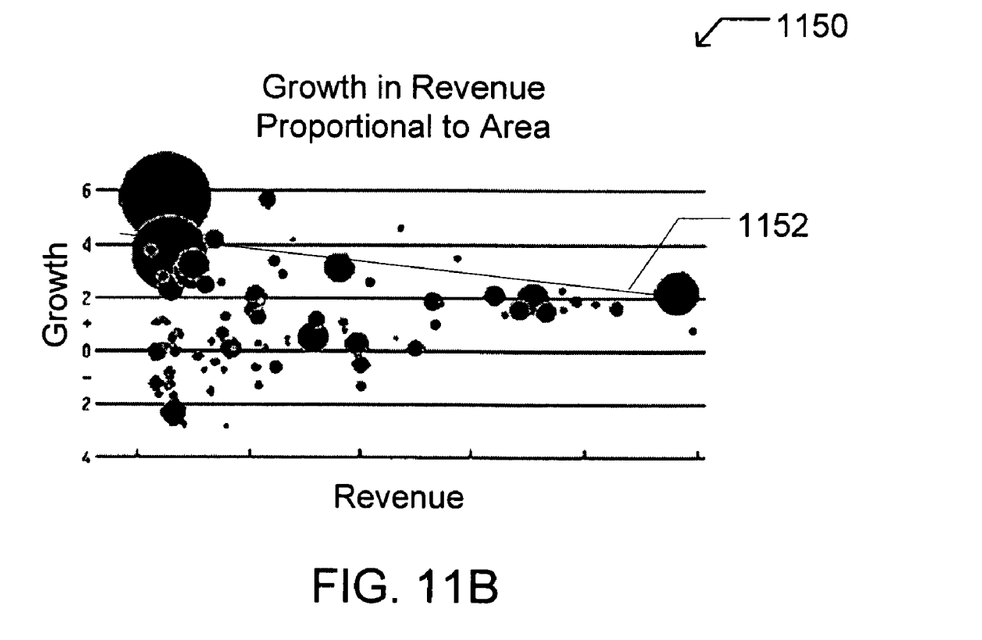
FIG. 11B illustrates an alternative visualization resulting from the work flow of FIG. 10 in view of FIG. 11A.

FIG. 11B illustrates a bubble plot 1150 resulting from the work flow of FIG. 10 in view of FIG. 11A. Each uniformly sized circle in scatter plot 1100 is replaced with a bubble the size of which is proportional to the store's area. Regression line 1102 and regression line 1152 are shown for scatter plot 1100 and bubble plot 1150. Any inference from these lines is greatly affected by the switch from scatter plot to bubble plot; the slopes of regression line 1102 and regression line 1152 have different signs. It is believed that by taking the user from a table to a scatter plot then to a bubble plot the user is not overwhelmed.

In an embodiment, the workflow of FIGS. 10, 11A and 11B occurs without a selection of focus. The report in the freefrom pane 850 of FIG. 10 has a small number of dimensions and measures. Computer 100, through its data combination validation module 120, is aware of the semantic meaning of each possible combination of dimensions and measures from freeform pane 850. Therefore, computer 100 suggests a scatter plot among other visualizations in a list of visualizations presented to the user.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium, comprising executable instructions to:

receive a region of focus within a report that is displayed, wherein the report includes information automatically retrieved from a data source and the information is structured in accordance with a report schema, wherein the region of focus is a user selected portion within the report;

analyze proximity to determine the order in which dimensions and measures are added to the region of focus;

derive a plurality of visualizations based on the region of focus, report context and data combination validation, wherein data combination validation determines if a combination of dimensions and measures is semantically acceptable;

present the plurality of visualizations to a user;

receive a choice for a visualization from the user; and generate a rendered visualization in accordance with the choice, wherein the rendered visualization forms a portion of the report that is displayed.

2. A non-transitory computer readable medium, comprising executable instructions to:

receive a region of focus within a report that is displayed, wherein the report includes information automatically retrieved from a data source and the information is structured in accordance with a report schema, wherein the region of focus is a user selected portion within the report;

derive a plurality of visualizations based on the region of focus, report content, and semantics of possible combinations of dimensions and measures;

prioritize a visualization based upon proximity between the region of focus and the dimension or measure associated with the visualization;

present the plurality of visualizations to a user;

receive a choice for a visualization from the user; and generate a rendered visualization in accordance with the choice, wherein the rendered visualization forms a portion of the report that is displayed.

3. The non-transitory computer readable storage medium of claim 1 further comprising executable instructions to analyze the region of focus and a time-based dimension to create a time-series chart.

4. The non-transitory computer readable storage medium of claim 1 further comprising executable instructions to analyze metadata to differentiate between a dimension and a measure.

5. The non-transitory computer readable storage medium of claim 1 further comprising executable instructions to prioritize a visualization based upon proximity between the region of focus and the dimension or measure associated with the visualization.

6. The non-transitory computer readable storage medium of claim 1 further comprising executable instructions to expand the region of focus based upon dimensions and measures from the same data source as the report.

7. The non-transitory computer readable storage medium of claim 1 further comprising executable instructions to prioritize a visualization based upon past choices.

8. The non-transitory computer readable storage medium of claim 1 further comprising executable instructions to prioritize a visualization based upon a programmatic default.

9. The non-transitory computer readable storage medium of claim 2 further comprising executable instructions to analyze the region of focus and a time-based dimension to create a time-series chart.

10. The non-transitory computer readable storage medium of claim 2 further comprising executable instructions to analyze metadata to differentiate between a dimension and a measure.

11. The non-transitory computer readable storage medium of claim 2 further comprising executable instructions to analyze proximity to determine the order in which dimensions and measures are added to the region of focus.

12. The non-transitory computer readable storage medium of claim 2 further comprising executable instructions to expand the region of focus based upon dimensions and measures from the same data source as the report.

13. The non-transitory computer readable storage medium of claim 2 further comprising executable instructions to prioritize a visualization based upon past choices.

14. The non-transitory computer readable storage medium of claim 2 further comprising executable instructions to prioritize a visualization based upon a programmatic default.

15. A method comprising:
  receiving, by a computer, a region of focus within a report that is displayed, wherein the report includes information automatically retrieved from a data source and the information is structured in accordance with a report schema, wherein the region of focus is a user selected portion within the report;
  analyzing, by the computer, proximity to determine the order in which dimensions and measures are added to the region of focus;
  deriving, by the computer, a plurality of visualizations based on the region of focus, report context and data combination validation, wherein data combination validation determines if a combination of dimensions and measures is semantically acceptable;
  presenting, by the computer, the plurality of visualizations to a user;
  receiving, by the computer, a choice for a visualization from the user; and
  generating, by the computer, a rendered visualization in accordance with the choice, wherein the rendered visualization forms a portion of the report that is displayed.

16. The method of claim 15, further comprising:
  analyzing, by the computer, the region of focus and a time-based dimension to create a time-series chart.

17. The method of claim 15, further comprising:
  analyzing, by the computer, metadata to differentiate between a dimension and a measure.

18. The method of claim 15 further comprising:
  prioritizing, by the computer, a visualization based upon proximity between the region of focus and the dimension or measure associated with the visualization.

19. The method of claim 15, further comprising:
  expanding, by the computer, the region of focus based upon dimensions and measures from the same data source as the report.

20. The method of claim 15, further comprising:
  prioritizing, by the computer, a visualization based upon past choices.

21. The method of claim 15, further comprising:
  prioritizing, by the computer, a visualization based upon a programmatic default.

* * * * *